(12) United States Patent
Goetz

(10) Patent No.: US 6,889,425 B2
(45) Date of Patent: May 10, 2005

(54) METHOD FOR PRODUCING A RESISTIVE HEATING ELEMENT

(75) Inventor: Ulrich Goetz, Buching (DE)

(73) Assignee: Sintec Keramik GmbH & Co. KG, Halblech (DE)

( * ) Notice: Subject to any disclaimer, the term of this patent is extended or adjusted under 35 U.S.C. 154(b) by 0 days.

(21) Appl. No.: 10/372,295

(22) Filed: Feb. 25, 2003

(65) Prior Publication Data

US 2003/0164369 A1 Sep. 4, 2003

(30) Foreign Application Priority Data

Mar. 1, 2002 (DE) ......................................... 102 09 080

(51) Int. Cl.$^7$ ................................................ H05B 3/00
(52) U.S. Cl. ............................. 29/611; 29/612; 29/613; 29/543; 29/840; 29/846; 219/543; 219/548; 219/549; 219/553; 438/691
(58) Field of Search ......................... 29/611, 543, 840, 29/846, 612, 613; 219/543, 548, 549, 553; 438/691

(56) References Cited

U.S. PATENT DOCUMENTS

| | | | | |
|---|---|---|---|---|
| 4,333,067 A | * | 6/1982 | Kugimiya et al. ............. | 338/34 |
| 4,814,586 A | * | 3/1989 | Grise ........................... | 219/549 |
| 5,765,279 A | * | 6/1998 | Moresco et al. .............. | 29/840 |
| 6,001,730 A | * | 12/1999 | Farkas et al. ................ | 438/627 |
| 6,103,625 A | * | 8/2000 | Marcyk et al. .............. | 438/691 |

\* cited by examiner

*Primary Examiner*—Carl J. Arbes
*Assistant Examiner*—Tim Phan
(74) *Attorney, Agent, or Firm*—Paul Vincent

(57) ABSTRACT

Method for producing a resistive heating element by coating a substrate with an electrically insulating material from the gaseous phase, depositing an electrically conducting material from the gaseous phase onto the layer of insulating material deposited onto the substrate, wherein the layer of conducting material deposited onto the layer of insulating material is subsequently partially mechanically removed thereby forming at least one conductor path. The substrate is machined before depositing the insulating material thereby forming at least one recess provided for receiving the conductor path. The layers of insulating material and conducting material are deposited onto the mechanically processed substrate. Finally, the layer of conducting material is evenly removed until at least the conducting material has been completely removed from the elevated regions of the substrate delimiting the recess of the conductor path, thereby forming the conductor path. The invention also concerns a resistive heating element produced in this fashion.

14 Claims, 2 Drawing Sheets

METHOD FOR PRODUCING A RESISTIVE HEATING ELEMENT

This application claims Paris Convention priority of DE 102 09 080.7 filed Mar. 01, 2002 the complete disclosure of which is hereby incorporated by reference.

BACKGROUND OF THE INVENTION

The invention concerns a method for producing a resistive heating element by coating a substrate with an electrically insulating material from the gaseous phase, depositing an electrically conducting material from the gaseous phase onto the layer of insulating material deposited onto the substrate, and subsequent mechanical removal of at least parts of the layer of a conductive material deposited onto the layer of insulating material thereby forming at least one conductor path. The invention also concerns a resistive heating element comprising a substrate onto which an electrically insulating layer is disposed, with an electrically conducting layer in the form of at least one conductor path being disposed onto the insulating layer.

Resistive heating elements of this type are conventionally used in various applications, in particular as heaters. They are produced by coating a usually plate-shaped substrate, e.g. of graphite, with an electrically insulating material, generally having a maximum layer thickness in the mm region. A further layer of an electrically conducting material is then deposited onto the layer of insulating material disposed on the substrate, wherein the layer thickness of the conducting material is adjusted in dependence on the desired electrical resistance. The layers are normally applied using chemical vapor deposition. When the conducting layer has been applied, it must be mechanically removed in parts to form an e.g. meandering conductor path. An electrical voltage is applied to the ends of the conductor path for operating the resistive heating element.

The mechanical processing of the flat conducting layer requires an excessive amount of time and expense and, in particular, requires high precision with tolerances of better than 0.01 mm, since short-circuits in the generated conductor path must be prevented and therefore the layer of conducting material between the regions which form the conductor path and which remain on the insulating layer must be completely removed. On the other hand, the insulating layer disposed below the layer of conducting material must not be impaired to prevent short-cuts. Moreover, layers which are, in particular, disposed onto relatively large-surface substrates through chemical vapor deposition have a varying thickness within their overall surface and must be mechanically finished to produce a constant conductor path thickness along its entire length. This renders processing more difficult.

It is therefore the underlying purpose of the invention to propose a simple and inexpensive method for producing a resistive heating element of the above-mentioned type thereby avoiding the above-mentioned disadvantages. The invention also concerns a resistive heating element which is produced by such a method.

SUMMARY OF THE INVENTION

The process-controlling part of this object is achieved in accordance with the invention by a method of the above-mentioned type in which the substrate is machined before deposition of the insulating material thereby forming at least one recess for receiving the conductor path, the layer of insulating material and the conducting material is deposited on the mechanically processed substrate and the layer of conducting material is evenly removed until at least the conducting material has been completely removed from the raised regions of the substrate bordering the recess of the conductor path to thereby form that conductor path.

In accordance with the invention, the substrate is mechanically prepared in correspondence with the desired shape of the conductor path to produce a recess which receives the conductor path, subsequently deposited from the gaseous phase. Mechanical preparation may be performed using any machining method, such as milling, grinding or the like and requires only relatively large tolerances. The layer of insulating material is then deposited onto the mechanically prepared substrate followed by gaseous phase deposition of the layer of conducting material, wherein the layer thickness of the insulating material may be relatively low, e.g. approximately 0.5 mm or less. The thickness of the layer of conducting material depends on the desired electrical resistance of the resistive heating element. After application of the two layers, at least the external layer of conducting material is evenly removed until the conducting material has been completely removed at least in the raised regions of the substrate bordering the recess of the conductor path thereby forming the conductor path, wherein the insulating layer disposed below the conducting layer becomes visible at the raised regions of the substrate to completely separate the individual conductor paths from each other through interposition of the insulating material. This can be produced through large-surface grinding. If the depth of the recess in the substrate is sufficient, the conducting layer can be removed in a rapid and straightforward fashion, thereby requiring relatively large tolerances in the region of 0.1 mm. Due to the initial formation of the recess in the substrate and deposition of the insulating layer and the conducting layer onto the surface contour formed in this fashion, the conductor path is consequently produced through planar removal of the conducting layer from the raised regions of the substrate which border the recess. This procedure is much simpler than the process of prior art with which the conductor path must be cut out of the evenly deposited conducting layer thereby keeping very narrow tolerances without locally destroying the underlying insulation layer.

In a preferred embodiment, the raised regions bordering the conductor path have sharp edges caused by machining of the substrate, wherein the raised regions of the substrate can be e.g. substantially square and/or saw-tooth shaped. Advantageously, deposition is thereby increased in the edge regions of the substrate between the recess and the raised regions during coating of the substrate via chemical vapor deposition. The increased thickness of the insulating layer in the edge regions ensures insulation on all sides of the formed conductor path during subsequent planar removal of the conducting layer.

Various materials can be principally used as the substrate carrier material, having material properties suitable for the respective purpose of use. Preferably, a substrate of graphite is used which is inexpensive and has a high rigidity and temperature resistance.

While pyrolytic boron nitride (PBN) is preferably used as the electrically insulating layer, pyrolytic carbon (pyrocarbon, PC) is preferably disposed as the electrically conducting layer. The mentioned materials have excellent insulating and conducting properties and can be easily deposited from the gaseous phase. They also have a high temperature stability. Boron nitride (white) has a different color than carbon (black) such that when the conducting layer is evenly removed, they can be easily visually distinguished and the pyrocarbon layer can be removed e.g. in a level fashion until the underlying boron nitride layer shows at the raised regions of the substrate to ensure insulation of the conductor path at all sides.

In a further development, after partial removal of the layer of conducting material thereby forming the conductor path, a covering layer of an insulating material is disposed thereon such that the conductor path of the resistive heating element is sealed and protected from external influence. The covering layer is preferably also deposited from the gaseous phase, wherein the covering layer is advantageously formed from the same material as the insulating layer, in particular of pyrolytic boron nitride (PBN).

Different methods can be used to deposit the insulating layer and the conducting layer and the optional covering layer onto the substrate. At least one of the layers can be applied through physical vapor deposition (PVC). This process refers to methods for producing thin layers wherein the coating material, e.g. boron nitride and/or pyrocarbon is/are transferred in vacuum into the gaseous phase through purely physical methods and are deposited on the surface to be coated. Three different method variants can be used: The coating material can be deposited onto the surface under high vacuum, wherein it is heated to transition either from the solid via the liquid into the gaseous state or directly from the solid into the gaseous state using electric resistance heating, electron or laser bombardment, electric arc evaporation or the like. Sputtering can also be used, wherein a solid target which consists of the respective coating material is atomized in vacuum by high energy ions, e.g. inert gas ions, in particular argon ions, with the ion source being e.g. an inert gas plasma. Finally, a target which consists of the respective coating material can also be bombarded with ion beams under vacuum, be transferred into the gaseous phase and be deposited on the surface to be coated. Of course, the above mentioned PVD methods can also be combined and at least one of the layers can be deposited e.g. through plasma-supported vapor deposition.

Alternatively or additionally, at least one of the layers can be deposited through chemical vapor deposition (CVD). In contrast to the PVD methods, the CVD method has associated chemical reactions. The gaseous components produced at temperatures of approximately 200 to 2000° C. through thermal, plasma, photon or laser-activated chemical vapor deposition are transferred with an inert carrier gas, e.g. argon, usually at underpressure, into a reaction chamber in which the chemical reaction takes place. The solid components thereby formed are deposited onto the surface to be coated. The volatile reaction products are exhausted along with the carrier gas.

Finally, at least one of the layers can also be deposited using a thermal injection method, e.g. by means of a plasma injection method. Therein, a fixed target is heated and transferred into the gaseous phase by means of a plasma burner through application of a high-frequency electromagnetic field and associated ionisation of a gas, e.g. air, oxygen, nitrogen, hydrogen, inert gases etc. The target may consist e.g. of boron nitride or pyrocarbon and be transferred into the gaseous phase and deposited on the surface to be coated in a purely physical fashion. The target can also consist of boron and be deposited as boron nitride on the surface to be coated through reaction with the ionised gas—in the present case nitrogen.

The invention also concerns a resistive heating element having a substrate on which an electrically insulating layer is deposited, onto which an electrically conducting layer is deposited in the form of at least one conductor path which is, in particular, produced using a method of the above-mentioned type. In accordance with the invention, the conductor path is embedded in at least one recess of the substrate which is defined and bordered by raised regions formed in the substrate. The raised regions which define and limit the recess with the conductor path, insulate the sides of the conductor path and permit simple and inexpensive production of the resistive heating element through even removal of the conducting layer deposited on the surface contour of the substrate, thereby interposing the insulating layer.

As mentioned above, the raised regions of the substrate limiting the conductor path preferably have sharp edges to ensure increased deposition, in particular of the insulating layer, in these regions. The edge regions may have an e.g. substantially square and/or saw-tooth shape.

While the substrate may preferably consist substantially of graphite, the layers of insulating material or conducting material substantially consist of pyrolytic boron nitride (PBN) or pyrolytic carbon (PC).

In a preferred embodiment, a covering layer of an insulating material is disposed onto the conductor path to protect the conductor path of the resistive heating element from external influences. The covering layer preferably consists of the same material as the insulating layer disposed between substrate and conductor path, in particular substantially of pyrolytic boron nitride (BN).

The insulating layer and/or the conducting layer and/or the covering layer are suitably disposed on the substrate using physical or chemical vapor deposition (PVD, CVD) or through thermal injection methods.

The invention is explained in more detail below by means of embodiments with reference to the drawings.

DESCRIPTION OF THE PREFERRED EMBODIMENT

Figure 1:
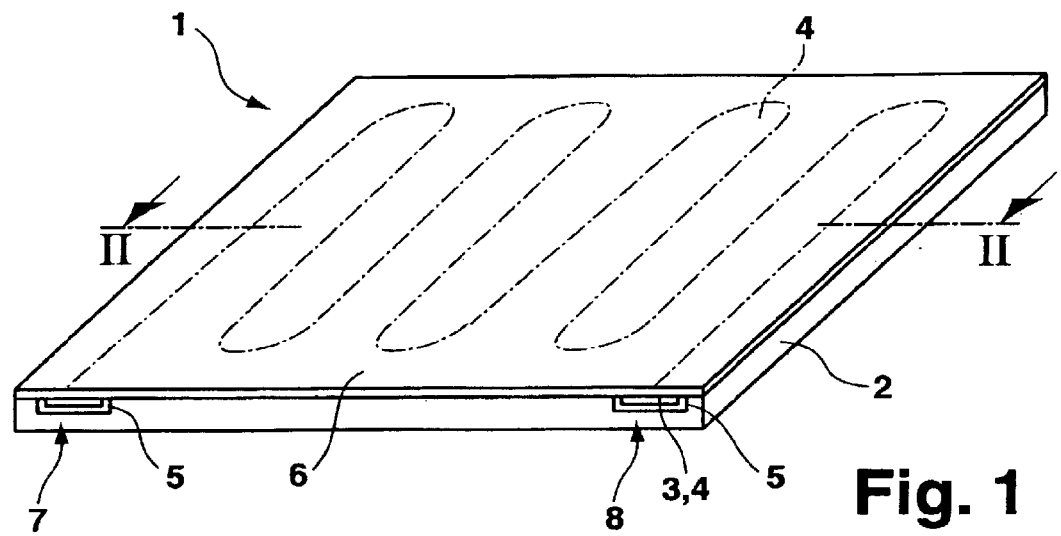
FIG. 1 shows a perspective view of an embodiment of a resistive heating element.

FIG. 1 shows an embodiment of an inventive resistive heating element 1. The resistive heating element 1 comprises a substrate 2 which serves as carrier material and which is substantially plate-shaped, e.g. of graphite, and an electrically conducting layer 3 in the form of a, in the present embodiment, meandering conductor path 4 (shown with dash-dotted lines) e.g. of pyrolytic carbon. An insulating layer 5, e.g. of pyrolytic boron nitride is disposed between the substrate 2 and the conducting layer 3 forming the conductor path 4. Moreover, the side of the conducting layer 3 facing away from the substrate 2 is provided with an insulating covering layer 6 for protecting the conductor path 4 from external effects which also consists e.g. of pyrolytic boron nitride. The ends of the conductor path 4 connecting to an outer side of the resistive heating element 1 serve as terminals 7, 8 for applying an electric voltage.

Figure 2:
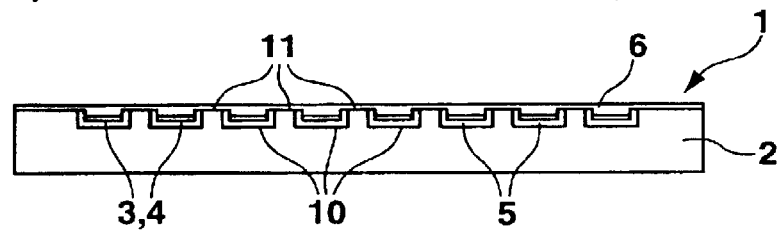
FIG. 2 shows a cross-section II—II through the resistive heating element of FIG. 1.

As shown in FIG. 2, the conductor path 4 is embedded in a recess 10 of the substrate 2 following its meandering form (FIG. 1) and electrically insulated from the substrate by the insulating layer 5. The recess 10 is bordered, defined and limited by raised regions 11 of the substrate 2 which, in the present embodiment, have a substantially square cross-section.

Figure 3:
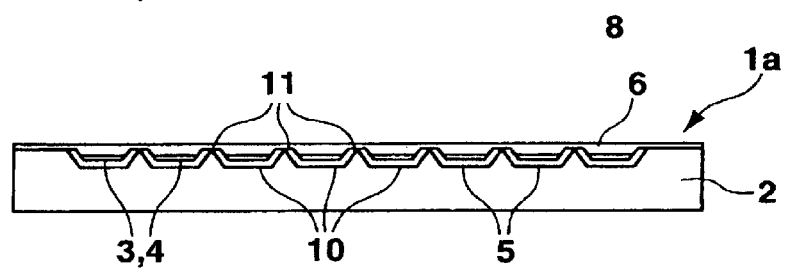
FIG. 3 shows a cross-section of FIG. 2 through another embodiment of a resistive heating element.

The embodiment of a resistive heating element 1a shown in FIG. 3 differs from the resistive heating element 1 of FIGS. 1 and 2 in that the raised regions 11 limiting the recess 10 in the substrate 2 for receiving the conductor path 4 are substantially saw-tooth shaped.

Figure 4:
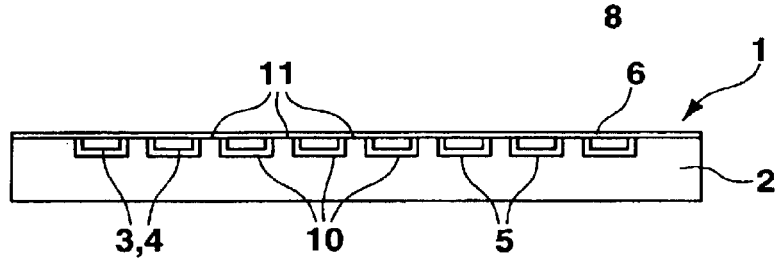
FIG. 4 shows a cross-section through the resistive heating element of FIG. 2 with a slightly larger conductor path layer thickness.
Figure 5:
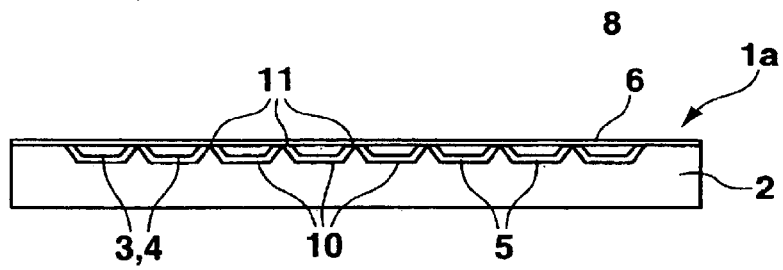
FIG. 5 shows a cross-section through the resistive heating element of FIG. 3 with a slightly larger conductor path layer thickness.

FIG. 4 shows a resistive heating element 1 whose conductor path 4 is thicker than that of the resistive heating element 1 of FIG. 2 and which consequently has reduced electrical resistance. In the present embodiment, the conductor path 4 is flush with the raised regions 11 formed on the substrate 2. The same is true for the resistive heating element 1a of FIG. 5, in contrast to the resistive heating element 1a of FIG. 3.

Figure 6:
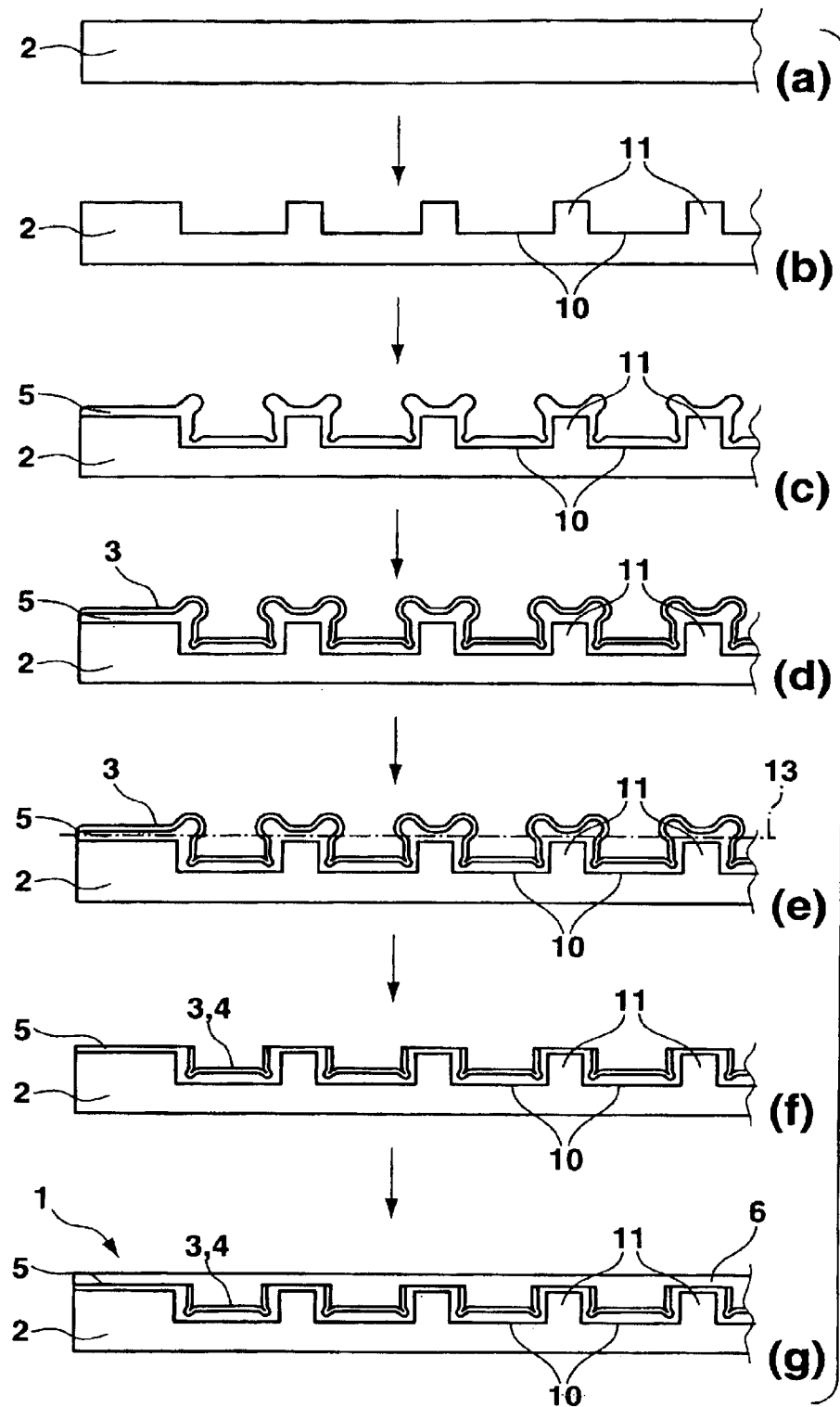
FIG. 6 shows one respective partial cross-section of FIG. 2 through the resistive heating element of FIGS. 1 and 2 at different production stages.

FIG. 6 shows a schematic method flow diagram which shows different production states of the resistive heating element 1 of FIGS. 1 and 2.

A substantially plate-shaped substrate 2 (FIG. 6a) is mechanically prepared through machining, such as milling, grinding or the like and in correspondence with the shape of the desired conductor path to form, in particular, a meandering recess 10 for receiving the conductor path (FIG. 6b). The raised regions 11 limiting the recess 10 are formed to have sharp edges, e.g. square.

A layer 5 of an insulating material is then deposited from the gaseous phase onto the prepared surface of the substrate 2 (FIG. 6c) which can, in particular, be carried out using PVC, CVD or thermal injection methods. FIG. 6c shows that the insulating layer 5 is increasingly deposited at the sharp edges of the elevations 11 such that the layer thickness in these regions is increased. A layer 3 of conducting material is then deposited onto the insulting layer 5 which can also be effected using PVD, CVD or thermal injection methods (FIG. 6d). The layer thickness in the edge region of the elevations 11 of the recess 10 of the substrate 2 is again increased.

The layer 3 of conducting material is then evenly removed along the dot-dashed line 13 (FIG. 6e) until at least the conducting material has been completely removed from the raised regions 11 of the substrate 2 defining the recess 10 of the conductor path 4 to thereby form the conductor path 4 (FIG. 6f). Due to the increased deposition in particular of the insulating layer 5 on the sharp edges of the elevations 11, the conducting layer 3 can be evenly removed above the sharp-edged elevations 11, thereby allowing relatively large tolerances while ensuring perfect insulation of the conductor path 4. In the present case, the insulating layer 3 is removed from the raised regions 11 together with the conducting layer 5 until approximately half of the original layer thickness of the insulating layer 3 remains on the raised regions 11 thereby producing increased safety with regard to electrical insulation between the paths of the conductor path 4. Alternatively, the insulating layer 5 can be substantially completely removed from the raised regions 11 or nearly completely remain on those raised regions 11. This produces the possibility of rapid and inexpensive mechanical post-processing thereby requiring only relatively large tolerances. In any case, it must be ensured that the upper conducting layer 3 is completely removed from the raised regions 11 to reliably prevent short-circuits 4 of the conductor path 4.

The conducting layer 3 and optionally at least part of the insulating layer 5 can be removed at the raised regions 11 e.g. through surface grinding. FIG. 6f shows that a conductor path 4 is thereby formed which is embedded in the recess 10 in the substrate 2 with interposition of the insulating layer 5.

If a resistive heating element with reduced electrical resistance is desired, the conducting material can be deposited with a greater layer thickness e.g. such that it completely fills the recess 10 formed in the substrate 2 (FIG. 4).

Usually but not necessarily, an insulating covering layer 6 is disposed onto the conductor path 4 (FIG. 6g) which preferably consists of the same material as the insulating layer 5 to protect the resistive heating element 1 from external influences. The covering layer 6 can be applied in the manner used for application of the insulating layer 5 and/or the conducting layer 3.

The inventive method permits simple and inexpensive production of the resistive heating element 1, wherein, in particular, the demanding method step of partial removal of the conducting layer 3 in one plane thereby keeping tight tolerances is avoided. In contrast thereto, in accordance with the invention, the mechanical preparation of the substrate 2 (FIG. 6b) ensures simple and rapid, flat removal of the conducting layer 3 from the raised regions 11 of the substrate 2 thereby forming the conductor path 4 wherein, in particular, the increased deposition of insulating layer 5 at the sharp-edged elevations 11 safely prevents short-circuits of the conductor path 4 while requiring only relatively loose tolerances. If the insulating layer 5 consists e.g. of pyrolytic boron nitride (white) and the conducting layer 3 of pyrolytic carbon (black), flat removal of the conducting layer 3 (FIG. 6e) leads to straightforward visual indication of complete conducting layer 3 removal at the raised regions 11 of the substrate 2, thereby forming the conductor path 4.

I claim:

1. A method for producing a resistive heating element, the method comprising the steps of:
   a) physically processing a substrate by mechanical machining to form at least one recess track at at least one side of said substrate;
   b) applying, following step a), an electrically insulating material onto said substrate to seat within said recess track and to coat raised portions of said substrate delimiting said recess track;
   c) applying, following step b), an electrically conducting material to seat within said recess track and to cover at least portions of said insulating material; and
   d) evenly removing, following step c), said electrically conducting material in a substantially planer fashion until at least said conducting material is removed from said raised portions of said substrate, thereby forming a conductive path within said recess track which is insulated from said substrate by said electrically insulating material, wherein said substrate, said recess track, said electrically insulating material, and said electrically conducting material are selected, structured, and dimensioned to form a resistive heater element.

2. The method of claim 1, wherein steps b) and c) each comprise application of said electrically insulating material and said electrically conducting material through deposition from a gaseous phase.

3. The method of claim 2, wherein at least one of steps b) and c) comprise physical vapor deposition (PVD).

4. The method of claim 2, wherein at least one of steps b) and c) comprise chemical vapor deposition (CVD).

5. The method of claim 1, wherein said raised portions delimiting said conductive path are provided with sharp edges during physically processing of the substrate in step a).

6. The method of claim 1, wherein said raised portions delimiting said conductive path are substantially square and/or saw-tooth shaped following processing in step a).

7. The method of claim 1, wherein said substrate consists essentially of graphite.

8. The method of claim 1, wherein said electrically insulating material consist essentially of pyrolytic boron nitride (PBN).

9. The method of claim 1, wherein said electrically in conducting material consists essentially of pyrolytic carbon (PC).

10. The method of claim 1, further comprising the step of disposing, following step d), a covering layer of insulating material onto said substrate to protect said conductive path.

11. The method of claim 10, wherein said covering layer is deposited from a gaseous phase.

12. The method of claim 10, wherein said covering layer consists essentially of pyrolytic boron nitride (PBN).

13. The method of claim 1, wherein at least one of steps b) and c) comprise a thermal injection method.

14. The method of claim 13, wherein at least one of steps b) and c) comprise a plasma injection method.

* * * * *